United States Patent [19]

Knipp et al.

[11] Patent Number: 5,039,293
[45] Date of Patent: Aug. 13, 1991

[54] DEVICE FOR THE MANUFACTURE OF A COMPOSITE PART

[75] Inventors: Ulrich Knipp, Bergisch-Gladbach; Otto Ganster, Odenthal-Hahnenberg; Bernhard Rentz, Leverkusen, all of Fed. Rep. of Germany

[73] Assignee: Bayer Aktiengesellschaft, Bayerwerk, Fed. Rep. of Germany

[21] Appl. No.: 203,402

[22] Filed: Jun. 6, 1988

[30] Foreign Application Priority Data

Jun. 17, 1987 [DE] Fed. Rep. of Germany ....... 3720211

[51] Int. Cl.⁵ .............................................. B29C 45/23
[52] U.S. Cl. .................................... 425/130; 425/562; 425/566
[58] Field of Search ................. 425/130, 562, 563, 566
[56] References Cited

U.S. PATENT DOCUMENTS 3,954,926 5/1976 Pahl et al. ...................... 264/46.4
4,013,391 3/1977 Boden et al. ...................... 425/562
4,188,356 2/1980 Weber et al. ..................... 425/563
4,314,955 2/1982 Boden et al. ..................... 425/562

FOREIGN PATENT DOCUMENTS 3436464 4/1986 Fed. Rep. of Germany ...... 425/130

Primary Examiner—Timothy Heitbrink
Attorney, Agent, or Firm—Joseph C. Gil

[57] ABSTRACT

The present invention relates to a process and a device for the production of a composite part by the sequential introduction of several fillings (consisting of at least one free-flowing reaction mixture, of which at least one forms a foamed material) into the hollow space of the mold of a closed form tool. A mixing device is attached to form tool. The mixer comprises injector nozzles for the reaction components pointing into a mixing chamber and an ejector piston for the cleaning of the mixer chamber. The ejector piston may be slid forward right up to the outlet orifice of the mixing chamber.

4 Claims, 2 Drawing Sheets

DEVICE FOR THE MANUFACTURE OF A COMPOSITE PART

BACKGROUND OF THE INVENTION

The present invention relates to a process and a device for the production of a composite part by means of the sequential introduction of several fillings (consisting of at least one free-flowing reaction mixture, of which at least one forms a foamed material) into the hollow space of the mold of a closed form tool. A mixing device is attached to the form tool. The mixer comprises injector nozzles for the reaction components pointing into a mixing chamber and an ejector piston for the cleaning of the mixer chamber. The ejector piston may be slid forward right up to the outlet orifice of the mixing chamber.

There is often a need for composite parts which consist of several layers, e.g., a foamed material core with an elastic, unfoamed, surface layer. Such parts find applications, for example, in motor vehicles in the form of "soft faces", bumpers or in the form of side aprons. In many cases a material having a covering on only one side would be sufficient; however it has been shown in practice that the composite deforms when very different materials are used.

According to DE-A-2,127,582 (corresponding to US-A 3,954,926) it is known to use a single mixing device with reaction mixtures that differ only in the amount of blowing agent. It is also known from this reference to use at least two mixing devices, with which various reaction mixtures are introduced one after the other. In the process, one mixing device is associated with each side of the hollow space of the mold, so that two feeder openings are present. The expense due to the mixing devices, of which there are at least two, is considerable.

The object of the present invention consists in providing a device and a process for the manufacture of composite parts wherein one mixing device is sufficient.

DESCRIPTION OF THE INVENTION

Figure 1:
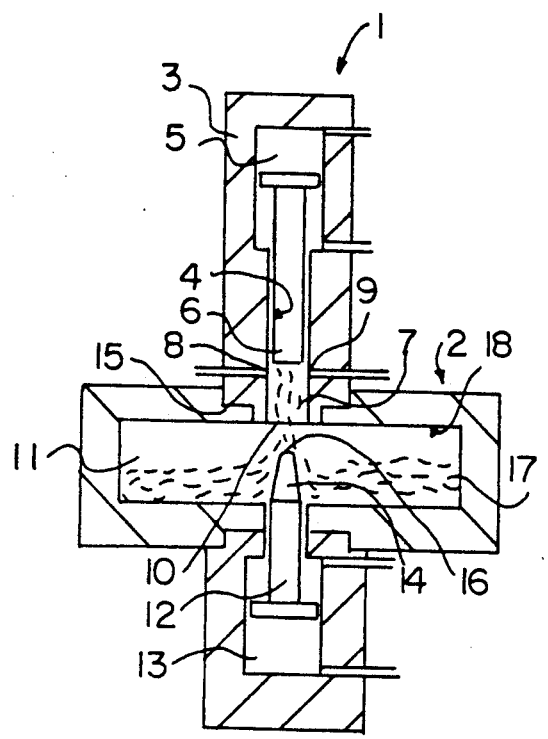
FIGS. 1 to 6 show a suitable embodiment of the device, at various stages of the process of filling the hollow space of the mold, and 7 shows a device according to a second embodiment.

The above-noted problem is solved by arranging a displacing piston opposite the outlet orifice of the mixing device on the other side of the hollow space of the mold. When the ejector piston is in the cleaning position the displacing piston may be slid forward to the front surface of the ejector piston. The end of the displacing piston pointing towards the outlet orifice is tapered.

The displacing piston can be retracted so that a first filling for a core material can be introduced (for example, a polyurethane-foam-forming reaction mixture). When this first filling has been introduced into the hollow space of the tool, the front surface of the displacing piston is pushed forward right against the front surface of the ejector piston. After hardening of the first filling, the second filling is introduced. As soon as this has also hardened, the displacing piston is drawn back, and a third filling can be introduced.

With an appropriate build-up of pressure in the hollow space of the mold due to the first filling, the second and third fillings (which can be of an identical foamable reaction mixture), form a compact or nearly compact material. However, different reaction mixture(s) may be used for the second and/or third fillings.

Due to the tapering of the displacing piston, a marking results on the composite, which, depending on the end position chosen for the displacing piston, may form a recess and/or a protruding mark. Insofar as such a marking is disadvantageous for use of the part, the composite must subsequently be reworked.

The tapering is preferably conically truncated in shape. This shape is both simple from the point of view of finishing technology and favorable from the point of view of flow technology.

According to a further embodiment, the tapering is in the form of a platform. This embodiment is especially suitable for establishing the thickness of the developing layer by the appropriate adjustment of the stroke of the displacing piston by means of the platform surface. Additionally, the reaction mixture leaving the mixing chamber is turned through 90° at the platform surface.

Of course, the tapering can also be of any other suitable shape. For example the tapering can also be formed by a crooked surface. The tapering can also be oval in shape or in the shape of a truncated pyramid, wherein the lateral surfaces are of different length and/or the sides are inclined at different angles. By shaping the tapering in this way, the flow of mixture leaving the mixing chamber may be distributed by quantity, and, depending on requirements, in various directions.

If the pistons are of circular cross-section, it is advantageous if, for a cleaning piston of diameter $D_3$, a displacing piston is of diameter $D_1$ with a front surface of diameter $D_2$, with $D_2 < D_1$, and $D_1$ and $D_2 < D_3$. The angle of tapering is preferably $< 90°$.

The new process for manufacturing a composite part starts from the sequential introduction of several fillings of at least one reaction mixture into the hollow space of a mold. Preferably, the first-introduced filling forms a foamed material. The mixing device is provided with an ejector piston, and the outlet opening of the mixing chamber opens into the hollow space of the mold.

The key to the present invention resides in the use of a tapered displacing piston on the side of the hollow space of the mold opposite the ejector piston. The front surface of the displacing piston is moved right up against the front surface of the ejector piston once the ejector piston has travelled to its cleaning position, and at the latest after the introduction of a first filling. After the first filling has reached a state resistant to puncturing, but still compressible, the displacing piston is brought into such a position that the second filling is pressed either against the side facing the mixing device or against the side facing away from the mixing device between the side of the hollow space of the mold and the first filling. Finally, the displacing piston is brought into another position and after the achievement of a desired degree of hardening of the second filling, a third filling is pressed on the other side of the first filling between the first filling and the side of the hollow space of the mold.

Depending on the quantities of the second and third fillings, the core formed by the first filling may be partially layered on both sides or completely enveloped. In the region of the piston, however, the core of the composite part is penetrated by the second filling and forms a mark as a result of the tapering of the displacing piston. This mark must be re-worked if it would disturb the ultimate use of the composite part.

A variant of the new process consists in applying, on the other side of the first filling, not the second reaction mixture as the third filling, but rather a totally different reaction mixture. This different reaction mixture is applied when the displacing piston has its front surface against the ejector piston in its cleaning position. The displacing piston travels back after the second filling has achieved the desired degree of hardening. This variant is particularly useful if one surface side represents a visible surface and is to consist of a special high-value material, while the rear side can be layered by a material of lower value, which need only have such properties as will prevent a deformation of the composite part.

Reaction components forming polyurethane-foamed material or polyisocyanurate-foamed material are especially suitable as reaction mixtures for the core material. Reaction mixtures based on epoxy resins or unsaturated polyester resins are especially suitable as further reaction mixtures.

Foamed molded articles with a closed skin covering layer may be produced by means of the new process. The so-called integral skin foam technology has been the customary method for that until today. In the integral skin process, fluorocarbons are required as necessary low-boiling solvents. In the new process, these fluorocarbons can be dispensed with, for the carbon dioxide arising out of the isocyanate-water reaction can be used as the blowing agent.

Before carrying out the new process it is also possible to arrange reinforcements in the mould cavity, for example a glass fiber mat, which is later embedded in the molded article.

The device is represented purely schematically in several figures in two examples of embodiment in the drawing, as subsequently explained in greater detail.

In FIGS. 1 to 6, the device comprises a mixing device 1 and a form tool 2. The mixing device 1 consists of a housing 3 with a guide bore 4 for an ejector piston 6 which may be activated by a hydraulic drive 5. The ejector piston evacuates the mixing chamber 7, or allows the reaction mixture to be mixed in the mixing chamber. Injection orifices 8, 9, which are connected with vessels containing the reaction components for the production of the various reaction mixtures, open into the mixing chamber 7. The mixing device 1 is built onto the form tool 2. The outlet opening 10 of the mixing chamber 7 opens immediately into the hollow space of the mold 11. A displacing piston 12 with hydraulic drive 13 is arranged opposite the outlet opening. The hydraulic drives 5 and 13 are connected to a hydraulic control (not represented), which works according to a predetermined program. The free end of the displacing piston 12 comprises a tapering 14 in the shape of truncated cone. The front surface of the ejector piston is designated by 15, the front surface of the displacing piston by 16.

In FIG. 1, the ejector piston 6 is in mixing position and the displacing piston 12 in a withdrawn position which enables the introduction of the first reaction mixture 17.

Figure 2:
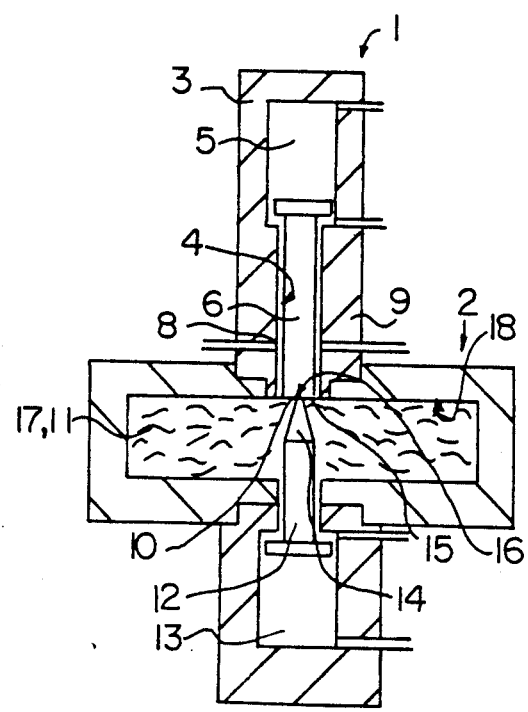

FIG. 2 shows the position of the ejector piston 6 and displacing piston 12 after the introduction of the first filling 17, which consists of a foamable reaction material. While this first filling 17 is still fluid, both pistons 6, 12 are pushed against each other until they touch each other with their front surfaces 15, 16 at the outlet opening 10. A passage for the second reaction mixture (second filling) remains even after solidifying of the first filling 17, (which foams into a polyurethane-foamed material core).

Figure 3:
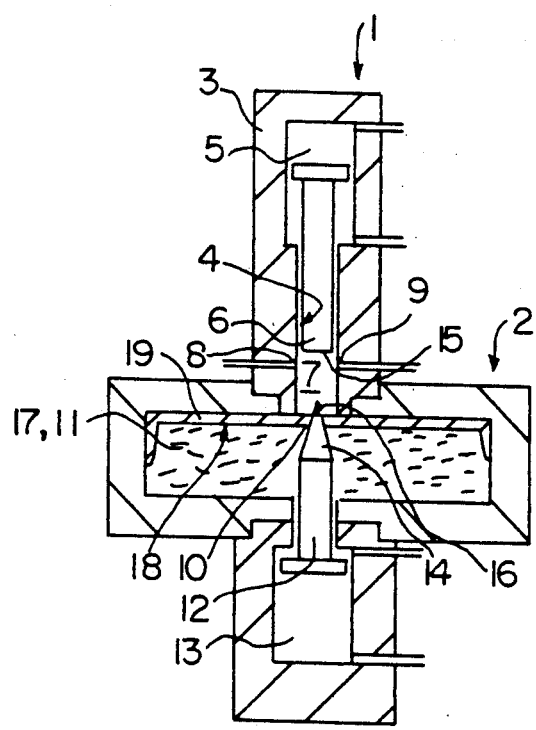

After the foamed material core 17 has attained a puncture-resistant, but still compressible state, the ejector piston 6 travels back, while the displacing piston 12 is left in its position. Components forming an elastomer (e.g., a polyurethane elastomer) are introduced to the injection orifices 8, 9 (second filling). Because of the differences in the diameters of ejector piston 6 and displacing piston 12 and of the letter's front surface 16, this second filling penetrates between the side 18 of the hollow space of the mold 11 and the foamed material core 17 and forms a layer 19, as represented in FIG. 3.

Figure 4:
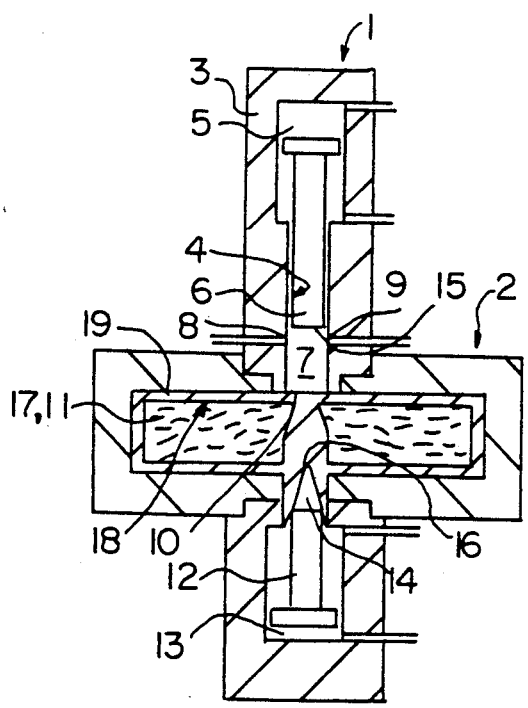

Once the second filling has hardened, the displacing piston 12 travels back into the position represented in FIG. 4, and the third reaction mixture (third filling) is introduced so that the space evacuated is filled and the foamed material core 17 is layered on the other side.

Figure 5:
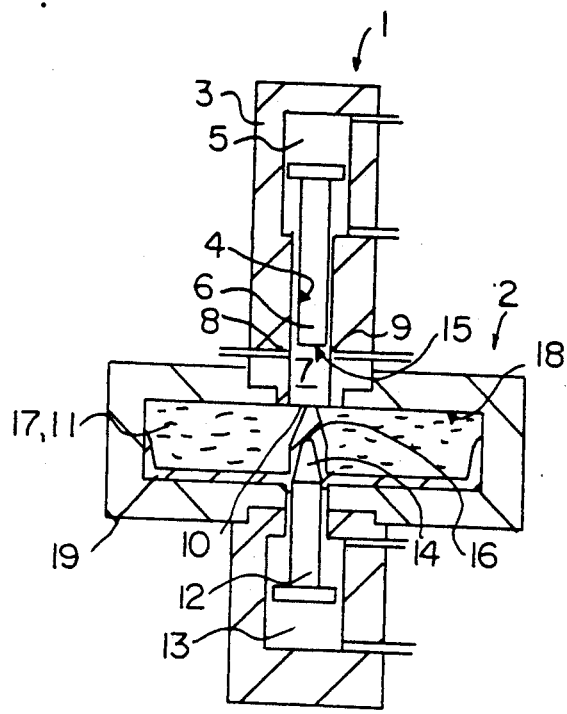
Figure 6:
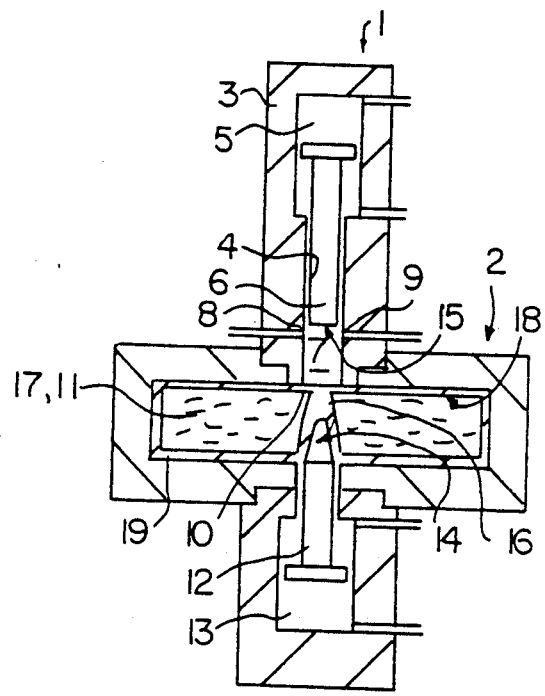

FIGS. 5 and 6 show yet another sequence of the steps in the introduction of the second reaction mixture (second filling). The ejector piston 6 and the displacing piston 12 travel into the position shown in FIG. 5 after attainment of the compressible but puncture-resistant state of the first filling. The second reaction mixture (second filling) is first pressed against the side facing away from the mixer casing 1 between foamed material core 17 and side 18 of the hollow space of the mold 11 and forms a layering 19. After hardening of the second reaction mixture (second filling) the third reaction mixture (third filling) is introduced with the position of the displacing piston as shown in FIG. 5. Under compression of the foamed material core 17, the covering layer 18 facing the mixing device 1 develops, as shown in FIG. 6. An appropriate additional quantity of second reaction mixture can also be applied as a third filling.

Figure 7:
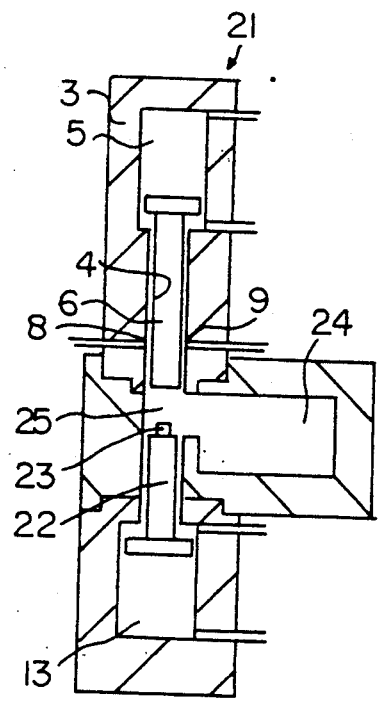

The example of embodiment according to FIG. 7 differs from that according to FIGS. 1 to 6 in that the mixing device 21 and the displacing piston 22, which has a platform as tapering 23, are so arranged in relation to the hollow space of the mold 24, that a lateral sprue 25 results. The sequence of steps of the process may be carried out in the same manner as that described in connection with FIGS. 1 to 6.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for the production of a composite part, said device comprising a mold having a hollow space, a mixing device attached to said mold, said mixing device comprising injection orifices opening into a mixing chamber, said mixing chamber having an outlet opening into said hollow space, and an ejector piston capable of closing said injection orifices and capable of cleaning said mixing chamber and filling said outlet, a displacing piston arranged opposite said outlet and capable of touching said ejector piston when said ejector piston fills said outlet and wherein said displacing piston is tapered.

2. The device of claim 1, wherein the tapering of the tapered surface is in the shape of a truncated cone.

3. The device of claim 1, wherein the tapering of the tapered surface is in the shape of a platform.

4. The device of claim 1, wherein the contour of the front surface of the displacing piston is smaller than that of the front surface of the ejector piston.

* * * * *